United States Patent
Cowlishaw et al.

(10) Patent No.: US 8,219,605 B2
(45) Date of Patent: Jul. 10, 2012

(54) DECIMAL FLOATING-POINTING QUANTUM EXCEPTION DETECTION

(75) Inventors: Michael F. Cowlishaw, Coventry (GB); Silvia Melitta Mueller, Boeblingen (DE); Eric Schwarz, Gardiner, NY (US); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/789,765

(22) Filed: May 28, 2010

(65) Prior Publication Data

US 2011/0296229 A1    Dec. 1, 2011

(51) Int. Cl.
G06F 11/00    (2006.01)
(52) U.S. Cl. ........................................................ 708/530
(58) Field of Classification Search ................. 708/204, 708/530
See application file for complete search history.

(56) References Cited

U.S. PATENT DOCUMENTS

| | | | |
|---|---|---|---|
| 3,878,380 | A | 4/1975 | Tsuiki |
| 5,892,697 | A | 4/1999 | Brakefield |
| 6,427,160 | B1 | 7/2002 | Parks et al. |
| 7,290,023 | B2 | 10/2007 | Dhong et al. |
| 2002/0198918 | A1 | 12/2002 | Steele |
| 2004/0268324 | A1 | 12/2004 | Walker |
| 2008/0204284 | A1 | 8/2008 | Archbold et al. |
| 2008/0215659 | A1 | 9/2008 | Cowlishaw et al. |
| 2008/0270508 | A1 | 10/2008 | Ludvall |
| 2008/0270756 | A1 | 10/2008 | Lundvall et al. |

FOREIGN PATENT DOCUMENTS

| | | |
|---|---|---|
| JP | 63208939 | 8/1988 |
| JP | 63214835 | 9/1988 |
| JP | 1012332 | 1/1989 |
| JP | 7248902 | 9/1995 |
| JP | 2000305750 | 11/2000 |

OTHER PUBLICATIONS

International Search Report and Written Opinion for International Application No. PCT/EP2010/067054 dated Jan. 11, 2011.
International Business Machines Corporation, "z/architecture, Principles of Operation", Sixth Edition, (Apr. 2007), SA22-7832-05.
Tsen, C., et al., Hardware Design of Binary Integer Decimal-Based Floating-Point Adder, 25th IEEE International Conference on Computer Design, 2007 ICCD2007, Oct. 10, 2007, pp. 288-295.
Harrison, J., "Decimal Transcendentals via Binary," 19th IEEE International Symposium on Computer Arithmetic, 1063-6889/09, 2009.

*Primary Examiner* — Tan V. Mai
(74) *Attorney, Agent, or Firm* — Dennis Jung

(57) ABSTRACT

A system and method for detecting decimal floating point data processing exceptions. A processor accepts at least one decimal floating point operand and performs a decimal floating point operation on the at least one decimal floating point operand to produce a decimal floating point result. A determination is made as to whether the decimal floating point result fails to maintain a preferred quantum. The preferred quantum indicates a value represented by a least significant digit of a significand of the decimal floating point result. An output is provided, in response to the determining that the decimal floating point result fails to maintain the preferred quantum, indicating an occurrence of a quantum exception. A maskable exception can be generated that is immediately trapped or later detected to control conditional processing.

23 Claims, 3 Drawing Sheets

DECIMAL FLOATING-POINTING QUANTUM EXCEPTION DETECTION

FIELD OF THE INVENTION

The present invention generally relates to electronic arithmetic processors and more particularly to detection of particular arithmetic calculation conditions.

BACKGROUND OF THE INVENTION

Decimal floating point numbers and floating point numbers of other radices, such as those defined by the IEEE 754-2008 Floating-Point Standard, are useful for performing certain types of data processing. IEEE 754-2008 standard based processor designs have been created to directly support the processing defined by that standard. Example hardware formats for IEEE 754-2008 processors include decimal floating point data formats that are 32, 64, and 128 bits in length with defined coefficients of 7, 16, and 34 digits with a specified exponent range. Software processing environments, such as programming languages including Java that support Decimal Floating-Point numbers, sometimes use different length coefficients, which is referred to as "precision," with different ranges of exponents than are used by the hardware upon which the environments execute.

Decimal floating-point numbers maintain more than just the number's value, they also contain information representing the scale of the number. For instance, adding numbers that represent money in cents will generally produce a sum that is also represented in cents. Some software environments emulate decimal floating point number precision and range such that some decimal floating point operations produce results that exceed the available processing hardware precision and range. Such a condition can inadvertently lead to inaccurate results. Existing exceptions, such as inexactness, overflow and underflow exceptions, occur when the precision or range has been exceeded, but these exceptions fail to accurately detect all unexpected changes in the precision or an operation's result.

An example of an undetected potential error is a decimal floating point operation of adding two seven (7) digit monetary amounts represented in cents. Each of these source data elements would be an amount in the $10,000 range. Summing these two amounts is able to lead to an exact result in the $100,000 range. However, representing the result as cents in the $100,000 range with seven digits requires the exponent to not be the preferred exponent, which would indicate cents, and the precision of the result's value will be correspondingly reduced. Performing the same calculation with more precision would lead to an exponent indicating cents ($10^{-2}$) as the scale of the result. Existing exceptions would not detect this loss of scale in the produced result.

Some hardware implementations provide a rough method of detecting the above described case. In one example, data is checked to determine if the most significant digit is non-zero. Such a check is an over indication that the result may not have the preferred exponent because some accurate results would result in a "false positive" indication. This approach effectively reduces the useful precision for emulation by one digit since the most significant digit is used as an indicator of potential loss of scale.

Therefore, calculation accuracies are limited by not detecting unexpected changes in scale or precision of decimal floating point results produced by processor formatting limitations.

SUMMARY OF THE INVENTION

In one embodiment, a method for detecting processing exceptions includes a processor accepting at least one decimal floating point operand and performing a decimal floating point operation on the at least one decimal floating point operand to produce a decimal floating point result. A determination is made as to whether the decimal floating point result fails to maintain a preferred quantum. The preferred quantum indicates a defined value represented by a least significant digit of a significand of the decimal floating point result. In response to the determining that the decimal floating point result fails to maintain the preferred quantum, an output is provided indicating an occurrence of a quantum exception.

In another embodiment, a system for detecting processing exceptions includes a memory and a processor communicatively coupled to the memory. The processor includes an instruction processor. The instruction processor accepts at least one decimal floating point operand and performs a decimal floating point operation on the at least one decimal floating point operand to produce a decimal floating point result. The processor also includes a quantum exception detector. The quantum exception detector determines, in response to the instruction processor performing the decimal floating point operation, that the decimal floating point result fails to maintain a preferred quantum. The preferred quantum indicating a defined value represented by a least significant digit of a significand of the decimal floating point result. The processor further includes a quantum exception response unit. The quantum exception response unit provides, in response to the quantum exception detector determining that the decimal floating point result fails to maintain the preferred quantum, an output indicating a quantum exception. The quantum exception occurring in response to the decimal floating point result failing to maintain the preferred quantum.

In another embodiment, a computer program product for detecting processing exceptions includes a storage medium readable by a processing circuit and storing instructions for execution by the processing circuit for performing a method. The method includes accepting at least one decimal floating point operand and performing a decimal floating point operation on the at least one decimal floating point operand to produce a decimal floating point result. A determination is made as to whether the decimal floating point result fails to maintain a preferred quantum. The preferred quantum indicates a defined value represented by a least significant digit of a significand of the decimal floating point result. In response to the determining that the decimal floating point result fails to maintain the preferred quantum, an output is provided indicating an occurrence of a quantum exception.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
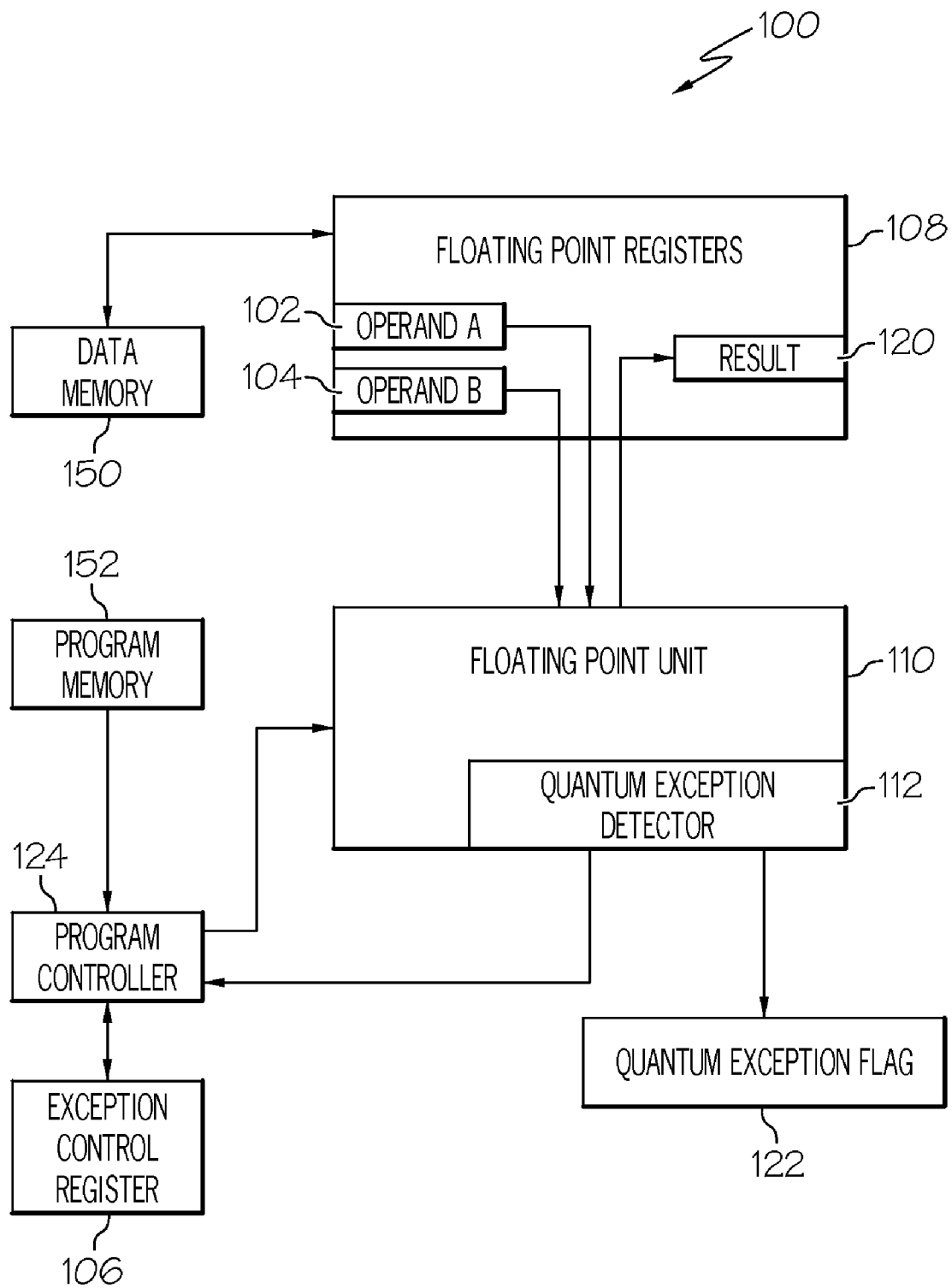
FIG. 1 illustrates a computer processor, in accordance with one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The system and methods described below include a decimal floating point processor that is able to generate an exception, referred to herein as a "quantum exception," when a result of a decimal floating point operation does not represent the preferred quantum, such as the preferred exponent as defined by the IEEE 754-2008 standard. This is especially useful for software or programming languages that support a decimal format that has a greater precision or range than the hardware upon with it executes because it allows detection of processing that exceeds the hardware format.

In the context of the present discussion, "quantum" refers to the "units" of the least significant digit of a floating-point representation. Previously defined floating point exceptions detect some processing inaccuracies, but do not completely detect the case of a result of a decimal floating point operation that has a representation of its scale or exponent that is not the preferred exponent. In other words, existing floating point exceptions do not completely indicate the case of a decimal floating point operation result that does not have the exponent that would have been created if there were greater precision in the processor to represent the coefficient. The IEEE 754-2008 standard defines the value of a preferred quantum, but does not define an exception for not achieving that preferred value in the result of decimal floating point operations. The quantum exception of the methods and systems described below is defined to have a similar control as other IEEE exceptions. The quantum exception also has an associated mask, flag, and exception code. This allows programming languages with different precisions and ranges to be easily emulated on the standardized formats and provide full precision and range of the formats while detecting unexpected exponent changes.

The quantum exception event of one embodiment occurs when a decimal floating point operation produces a result that is rounded or clamped. Although some Java implementations include separate events called Rounded and Clamped, the quantum exception of one embodiment essentially indicates that the precision or range of the result has been exceeded. The quantum exception reporting mechanism in one embodiment is controllable and has a mask bit to control the action resulting from assertion of the exception. In one embodiment, a mask bit is dedicated in a processor's Floating-Point Control word (FPC) to mask the quantum exception from trapping to the program exception handler. When the mask bit is one and a quantum exception occurs, the result of the decimal floating point operation causing the exception is written into the Floating-Point Registers (FPRs) and a code identifying the exception type is written to the Floating-Point Control word (FPC) and program execution is trapped to the program interrupt handler. When the mask bit is not set, the quantum exception flag, which is a sticky flag, is set and no trap is taken.

Embodiments of the present invention operate with decimal floating point numbers. A decimal floating point number as defined by various standards, including IEEE-754-2008, has three components: a sign bit, an exponent, and a significand. The magnitude of the number, which is an unsigned value, is the product of the significand and the radix raised to the power of the exponent. In a decimal floating point number, the radix is ten (10). The sign of the number is positive or negative depending on whether the sign bit is zero or one, respectively.

The significand has an implied radix point, and its position depends on which interpretation, or view, of the floating point datum is being applied. Embodiments of the present invention represent decimal floating point numbers with a right units view, where the rightmost digit of the significand is the units digit and the radix point is implied to be immediately to the right of the entire significand.

FIG. 1 illustrates a computer processor 100, in accordance with one embodiment of the present invention. The computer processor 100 includes an instruction processor that includes a decimal floating point unit 110, floating point registers 108 and program controller 124. The decimal floating point unit 110 receives decimal floating point instructions from a program controller 124, which receives program instructions stored in a program memory 152. The decimal floating point instructions issued to the decimal floating point unit 110 include, for example, instructions specifying data conversion and/or decimal floating point calculations to perform on one or more decimal floating point numbers. The decimal floating point unit 110 accepts decimal floating point operands by reading decimal floating point data from one or more source registers within the floating point registers 108, performs a specified decimal floating point operation, and stores the result into a destination register within the floating point registers. Data is generally exchanged between the floating point registers 108 and a data memory 150.

The decimal floating point unit of one embodiment performs operations on decimal floating point numbers according to applicable floating point processing standards, such as the IEEE-754-2008 Floating-Point Standard. The quantum values of the source operands that are the inputs to a decimal floating point operation are generally a basis for defining a preferred quantum as defined by the relevant standard for the output of that operation. Due to available precision in the decimal floating point unit 110, the values of the source operands may produce a result that has a quantum that is different from the preferred quantum. The quantum of the result may change from the preferred quantum due to, for example, limited hardware precision of the decimal floating point unit 110 that causes rounding of intermediate or final results of the specified operation. Differences between the calculating hardware precision and precision of software architectures incorporating decimal floating point arithmetic are detected by this loss of quantum detection mechanism allowing software to detect when there is a need to switch from hardware precision to emulating higher precision, which provides a performance optimized implementation.

The decimal floating point unit 110 of one embodiment includes a quantum exception detector 112. The quantum exception detector 112 detects the occurrence of a result produced by a decimal floating point operation that has a quantum that is different from the preferred quantum, where the preferred quantum is a defined value that is determined, for example, based upon the values and/or quantum of the source operands. Differences between the preferred quantum and the quantum of the result of a particular operation are able to be caused by, for example, a hardware overflow or underflow condition caused by the actual values of the source operands.

The quantum exception detector 112 of one embodiment asserts a "quantum exception" to indicate that a result produced by the decimal floating point unit 110 has a quantum, or exponent, value that is different from the preferred quantum value. The assertion and processing of the quantum exception of one embodiment is similar to other floating point processing exceptions. Assertion of the quantum exception in one embodiment is reflected in the quantum exception flags 122, which are maintained by the floating point unit 110 of one embodiment and are able to be changeably assigned an exception code to identify the decimal floating point exception being asserted, such as the quantum exception.

One embodiment of the present invention supports controlling the action taken in response to an assertion of a quantum exception by the quantum exception detector 112. One embodiment of the present invention maintains an exception control register 106 that includes one or more exception control masks that are changeably assigned a set or not set state. In one embodiment of the present invention, the processor includes a Floating-Point Control word (FPC) as an example of the exception control register 106.

The exception control register 106 allows, for example, setting masks to control responses to various floating point exceptions, such as the exceptions defined by the IEEE 754-2008 standard. In addition to allowing the definition of masks for exceptions defined by various standards, one embodiment of the present invention includes an additional mask bit to control the processing that occurs in response to an assertion of the above described quantum exception. In one embodiment, if a quantum exception occurs when the quantum exception mask bit assigned a set state, the arithmetic result produced by the decimal floating point unit, which has a quantum different than the preferred quantum, is written to the result register 120 in the floating point registers 108 and the program controller 124 is signaled to trap the execution of the program to the program's interrupt handler. If the quantum exception occurs when the quantum exception mask bit is assigned a not set state, a quantum exception flag 122 is set as a sticky flag and the program execution continues without a trap to the program's interrupt handler. The "sticky flag" quantum exception flag 122 in one embodiment remains set during processing of subsequent instructions to allow for deferred detection of, and the resulting processing in response to, the quantum exception after execution of that sequence of instructions following the occurrence of the quantum exception.

One embodiment of the present invention provides an additional control field in some machine code instructions to further control detection, and the action taken in response thereto, of quantum exceptions. In one example, some machine language instructions, such as decimal floating point machine language instruction, include a quantum exception control bit (XqC bit), or a quantum exception control field, in the machine language instruction text to enable quantum exception detection individually for those instructions. Examples of such instructions include, for example, a Convert from Integer instruction, a Divide instruction, a Load FP Integer instruction, a Load Rounded instruction, a Multiply instruction, a Quantize instruction, a Reround instruction, a Subtract instruction, and the like.

Including a quantum exception control bit or field in individual instructions enables the use of the same instruction in different ways to detect or not detect quantum exceptions and provides flexibility in detecting inexact result exceptions. Flexibility in detecting inexact result exceptions allows performing different processing when an arithmetic operation is expected to produce a result with, for example, implicit conversion or explicit conversion between data types or when an arithmetic operation results in, for example, floor and ceil operations as defined by various software programming languages. An example of an environment where unexpected implicit conversions may occur is a case where software decimal floating point implementations are emulated with greater precision that the hardware upon which the software executes. In such a case, the software environment, based upon its greater precision, determines that the specified calculation is able to maintain the preferred quantum. However, the hardware, which has less precision, must round the result and an inexactness condition is unexpectedly encountered. However, the "inexactness" resulting from explicit conversions, e.g., chopping off bits, should not result in altering program execution. In a case of an implicit conversion between data types of which the programmer would not be aware, then the inexactness should be detected and program execution should be altered for that case. Since inexactness is one component of a quantum loss, additional control is provided in one embodiment to control quantum exception detection, and the processing responses to the occurrence of those quantum exceptions, on an instruction basis.

In one embodiment, the control field of the selected decimal floating point instructions that is used to control other exceptions is expanded to also encode a quantum exception control field including quantum exception control bits (e.g., XqC bits). In one example, the quantum exception control bits (XqC bits) are encoded into a Rounding Mode Control field (RMC) of the selected decimal floating point instructions. The RMC field of one example is a four (4) bit field where values equal to 0 and 8 through 15 had been previously defined to control exceptions associated with particular explicit rounding modes. In this example, the quantum exception control field of one embodiment is allocated to values of the RMC field equal to 1 through 7. Values of the RMC field equal to 1 through 7 enable quantum exceptions and pick specific rounding modes for these values. Setting the RMC field of these selected instructions to values of 0 or 8 through 15 results in no detection of quantum exceptions when those instructions are executed. RMC field values equal to a value of 1 through 7, however, result in detection of quantum exceptions and corresponding altering of the program execution.

Figure 2:
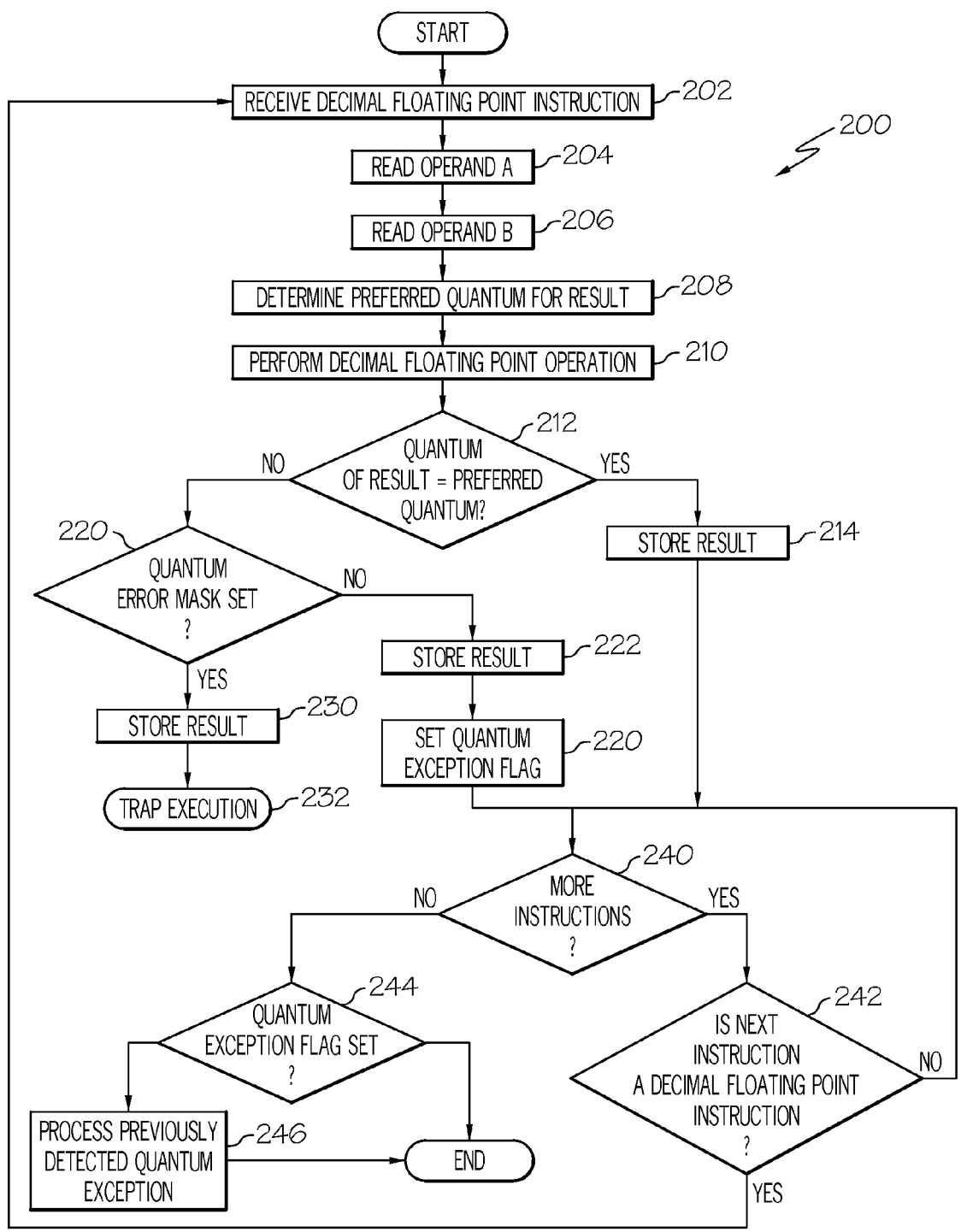
FIG. 2 illustrates a decimal floating point operation execution, in accordance with one embodiment of the present invention.

FIG. 2 illustrates a decimal floating point operation execution 200, in accordance with one embodiment of the present invention. The decimal floating point operation execution 200 begins by receiving, at 202, a decimal floating point operation instruction for execution by a decimal floating point unit 102. In one embodiment, the received decimal floating point operation instruction is part of a program stored in program memory 152 and is received by the program controller 124 of a computer processor 100. The program controller 124 issues the received decimal floating point operation instruction to a decimal floating point unit 110 for execution. In one embodiment, the decimal floating point instruction specifies a first source operand, Operand A 102, and a second source operand, Operand B 104. Although these two source operands are illustrated as residing in the floating point registers 108, various addressing modes are able to be used to specify source and destination operands that are located in various locations, as is understood by practitioners of ordinary skill in the art in light of the present discussion.

The processing continues by reading, at 204, the first source operand, Operand A 102, and reading, at 206, the second source operand, Operand B 104. Embodiments are able to accept one or more operands into an instruction processor through any suitable means. The preferred quantum for the result to be produced by the received decimal floating point operation is then determined, at 208. In one embodiment, the preferred quantum is determined based at least in part on the values of the two source operands, Operand A 102 and Operand B 104.

The decimal floating point operation specified by the received decimal floating point instruction is then performed, at 210. A determination is made, at 212, if the result of the executed decimal floating point instruction maintains the preferred quantum for that result.

If the result of the decimal floating point operation failed to maintain the preferred quantum, the processing continues to determine, at 220, if a quantum exception control mask is set. As described above, various embodiments provide one or more control masks to affect the result of an occurrence of a quantum exception. A general quantum exception control mask is able to be set in an exception control register 106, or a quantum exception control bit or field is able to be encoded into individual decimal floating point machine language instructions. In a case of encoding quantum exception control bits into individual instructions, one embodiment reads the quantum exception control bit, or mask, that is encoded into the machine language instruction and uses that value for the duration of the execution of that machine language instruction.

If the quantum exception mask is determined, at 220, to be set, the processor stores, at 230, the result of the decimal floating point operation into a result or destination location 120, such as the result register 120 of the floating point registers 108. The quantum exception is indicated by an output to the program controller 124 causing a trap, at 232, of program execution to the program's interrupt handler.

If the quantum exception mask is determined, at 220, to not be set, the quantum exception does not cause a trap of the program execution but rather the quantum exception is noted for later processing. In the case of the quantum exception mask being set, the processing of one embodiment stores, at 222, the result into a result or destination location 120, such as the result register 120 of the floating point registers 108. The quantum exception is indicated by setting a quantum exception flag 122 via a sticky flag to indicate that a quantum exception did occur.

If the decimal floating point operation performed at 210 produced a result that maintained the preferred quantum, that result is stored, at 214. In one embodiment, the result is stored in a result or destination location 120 of the floating point registers 108. It is noted that if the result of the decimal floating point operation maintained the preferred quantum, the value or state of the quantum exception flag 122 is not affected. By leaving the state of the quantum exception flag 122 unaffected, the indication of an occurrence of a quantum exception that occurred in a previously executed decimal floating point instruction is maintained in the quantum exception flag, and subsequent processing is able to examine the quantum exception flag 122 to determine if the result produced by a sequence of instructions may have been affected by a quantum exception occurring during the execution of that sequence of instructions.

After storing the result, at 214, or setting the quantum exception flag, at 224, the processing determines, at 240, if there are more instructions to execute. One embodiment of the present invention allows a sequence of instructions to be defined to be executed with the quantum exception mask not set such that a quantum exception occurring during any instruction of that sequence will cause a sticky quantum exception flag 122 to be set and allow continuing with the execution of that sequence of instructions. The sticky quantum exception flag 122 is then examined, as described below, to determine if a quantum exception occurred during the sequence of instructions. If the sticky quantum exception flag 122 is determined to be in a set state at the end of such a sequence of instructions, program execution is altered to execute special processing in response to the occurrence of the quantum change that addresses the occurrence of the quantum exception.

If more instructions exist, a determination is made, at 242, if the next instruction is a decimal floating point instruction. If the next instruction is a decimal floating point instruction, the processing returns to receiving, at 202, that decimal floating point instruction. If the next instruction is not a decimal floating point instruction, the processing returns to determining, at 240, if there are more instructions to execute.

When no more instructions remain to be executed, the processing of one embodiment continues to determine, at 244, if the quantum exception flag 122 has been set. As described above, the processing sets the quantum exception flag if the quantum exception mask has not been set and a quantum exception occurred during a sequence of program instructions. In the case of the quantum exception flag having been set, the processing performs, at 246, processing to accommodate the previously detected quantum exception event. The processing then ends.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
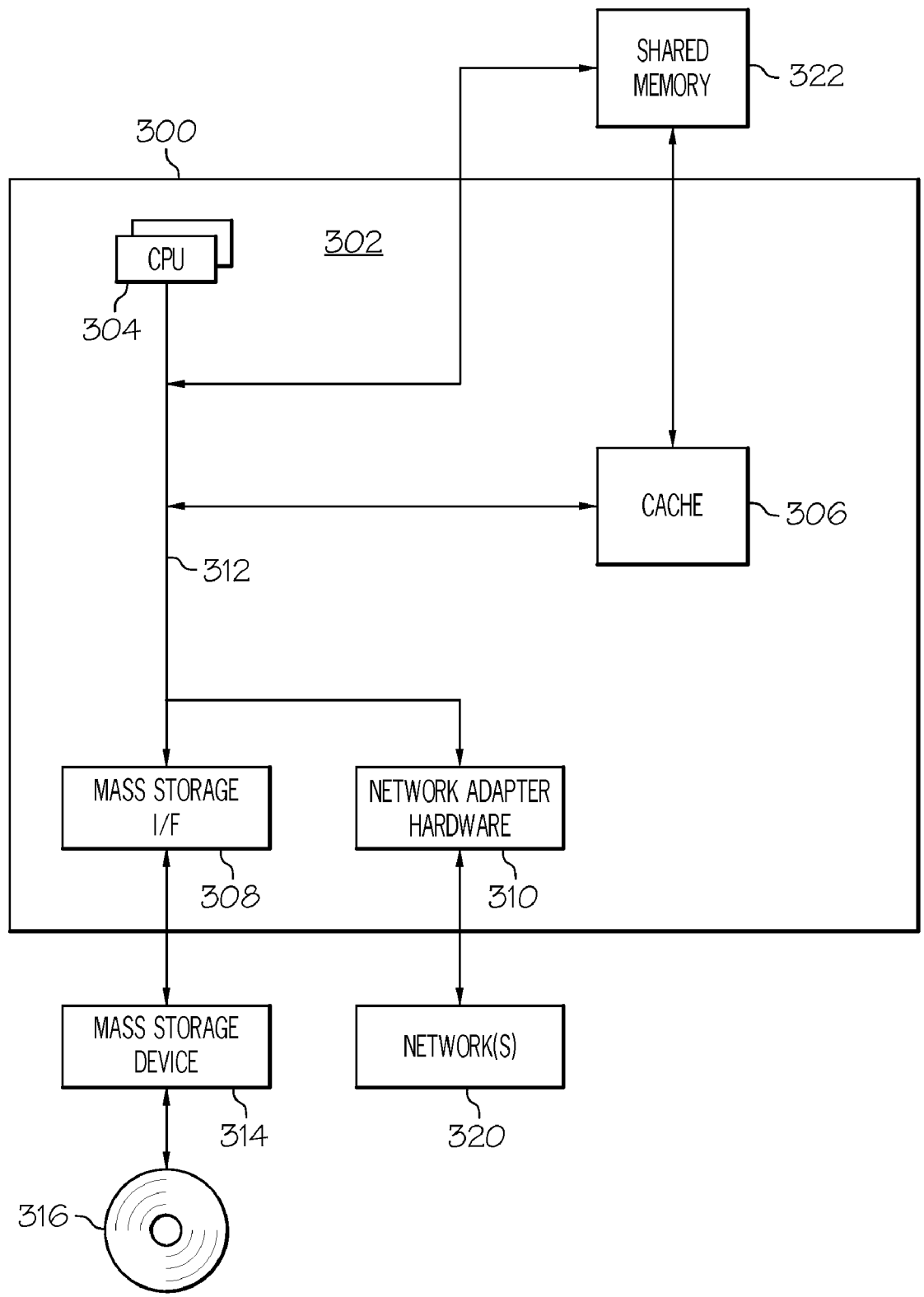
FIG. 3 is a block diagram illustrating an information processing system according to one embodiment of the present invention.

Referring now to FIG. 3, which is a block diagram illustrating an information processing system 300 that can be utilized in conjunction with processor 100 discussed above with respect to FIG. 1. The information processing system 300 is based upon a suitably configured processing system adapted to implement one or more embodiments of the present invention. Similarly, any suitably configured processing system can be used as the information processing system 300 by embodiments of the present invention.

The information processing system 300 includes a computer 302. The computer 302 has a processor(s) 304 that is connected to a cache memory 306, memory 322, mass storage interface 308, and network adapter hardware 310. A system bus 312 interconnects these system components.

The mass storage interface 308 is used to connect mass storage devices, such as data storage device 314, to the information processing system 300. One specific type of data storage device is an optical drive such as a CD/DVD drive, which may be used to store data to and read data from a computer readable medium or storage product such as (but not limited to) a CD/DVD 316. Another type of data storage device is a data storage device configured to support, for example, NTFS type file system operations.

An operating system (not shown) included in the memory 322 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 300. The network adapter hardware 310 in one embodiment provides network communications interfaces to one or more networks 320. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for detecting decimal floating point quantum exceptions, the method comprising:
  performing the following with a processor:
    accepting at least one decimal floating point operand;
    obtaining a machine instruction comprising an opcode for a decimal floating point operation; and
    executing the machine instruction, the executing comprising:
      determining a preferred quantum based upon the at least one decimal floating point operand, the preferred quantum indicating a defined value represented by a least significant digit of a significand of the decimal floating point result;

performing a decimal floating point operation on the at least one decimal floating point operand to produce a decimal floating point result;

determining, in response to the performing and determining the preferred quantum, that a quantum of the decimal floating point result is different than the preferred quantum; and providing, in response to the determining that the quantum of the decimal floating point result is different than the preferred quantum, an output indicating a quantum exception, the quantum exception occurring only in response to the quantum of the decimal floating point result being different than the preferred quantum.

2. The method of claim 1, the providing an output comprising setting, in response to determining that the quantum of the decimal floating point result is different than the preferred quantum, a quantum exception flag.

3. The method of claim 1, the providing an output comprising triggering a software execution trap.

4. The method of claim 1, further comprising:
maintaining a quantum exception flag in one of a set state and a not set state;
maintaining a quantum exception mask in one of a set state and a not set state;
executing a sequence of program instructions, the sequence of program instructions comprising the machine instruction;
storing the decimal floating point result into a destination storage location;
continuing, in response to the quantum exception mask being in the not set state and determining that the quantum of the decimal floating point result is different than the preferred quantum, execution of the sequence of instructions; and
trapping, in response to the quantum exception mask being in the set state and determining that the quantum of the decimal floating point result is different than the preferred quantum, execution of the sequence of program instructions, the trapping comprising executing a program interrupt handler, and
the providing the output comprising setting the quantum exception flag into the set state.

5. The method of claim 4, further comprising:
determining, subsequent to the executing the sequence of program instructions, that the quantum exception flag is in the set state; and
altering program execution, in response to determining that the quantum exception flag is in the set state and subsequent to the executing the sequence of program instructions, to address the occurrence of the quantum exception.

6. The method of claim 4, maintaining the quantum exception mask further comprising:
reading a quantum exception mask value encoded into a machine language instruction corresponding to the instruction for the decimal floating point operation,
the maintaining the quantum exception mask comprising using, for a duration of execution of the instruction for the decimal floating point operation, the quantum exception mask value.

7. The method of claim 6, where the quantum exception mask value is encoded into an exception control field of the machine language instruction, the exception control field further encoding exception masks for other floating point exceptions.

8. A system for detecting decimal floating point quantum exceptions, the system comprising:
a memory; and
a processor communicatively coupled to the memory, wherein the processor comprises an instruction processor configured to:
accept at least one decimal floating point operand;
obtain a machine instruction comprising an opcode for a decimal floating point operation; and
execute the machine instruction, comprising:
determining a preferred quantum based upon the at least one decimal floating point operand, the preferred quantum indicating a defined value represented by a least significant digit of a significand of the decimal floating point result; and
performing a decimal floating point operation on the at least one decimal floating point operand to produce a decimal floating point result;
a quantum exception detector for determining, in response to the instruction processor performing the decimal floating point operation and in response to determining the preferred quantum, that a quantum of the decimal floating point result is different than the preferred quantum; and
a quantum exception response unit for providing, in response to the quantum exception detector determining that the quantum of the decimal floating point result is different than the preferred quantum, an output indicating a quantum exception, the quantum exception occurring only in response to the quantum of the decimal floating point result being different than the preferred quantum.

9. The system of claim 8, the quantum exception response unit configured to set, in response to determining that quantum exception detector determining that the quantum of the decimal floating point result is different than the preferred quantum, a quantum exception flag.

10. The system of claim 8, the quantum exception response unit configured to provide an output comprising triggering a software execution trap.

11. The system of claim 8:
the instruction processor further configured to:
maintain a quantum exception flag in one of a set state and a not set state;
maintain a quantum exception mask in one of a set state and a not set state;
execute a sequence of program instructions, the sequence of program instructions comprising the machine instruction;
store the decimal floating point result into a destination storage location;
continue, in response to the quantum exception mask being in the not set state and the quantum exception detector determining that the quantum of the decimal floating point result is different than the preferred quantum, execution of the sequence of instructions; and
trap, in response to the quantum exception mask being in the set state and the quantum exception detector determining that the quantum of the decimal floating point result is different than the preferred quantum, execution of the sequence of program instructions, the quantum exception response unit traps execution by causing the instruction processor to execute a program interrupt handler; and the quantum exception response unit further configured to set the quantum exception flag into the set state in response to determining that the quantum of the decimal floating point result is different than the preferred quantum.

12. The system of claim 11, the instruction processor further configured to:

determine, subsequent to the executing the sequence of program instructions, that the quantum exception flag is in the set state; and alter program execution, in response to determining that the quantum exception flag is in the set state and subsequent to the executing the sequence of program instructions, to address the occurrence of the quantum exception.

13. The system of claim 11, the instruction processor further configured to:

read a quantum exception mask value encoded into a machine language instruction corresponding to the instruction for the decimal floating point operation; and use, for a duration of execution of the instruction for the decimal floating point operation, the quantum exception mask value.

14. The system of claim 13, wherein the quantum exception mask value is encoded into an exception control field of the machine language instruction, the exception control field further encoding exception masks for other floating point exceptions.

15. A computer program product for detecting decimal floating point quantum exceptions, the computer program product comprising:

a storage medium readable by a processing circuit and storing instructions for execution by the processing circuit for performing a method comprising:

accepting at least one decimal floating point operand;

obtaining a machine instruction comprising an opcode for a decimal floating point operation; and executing the machine instruction, the executing comprising:

determining a preferred quantum based upon the at least one decimal floating point operand, the preferred quantum indicating a defined value represented by a least significant digit of a significand of the decimal floating point result;

performing a decimal floating point operation on the at least one decimal floating point operand to produce a decimal floating point result;

determining, in response to the performing and in response to determining the preferred quantum, that a quantum of the decimal floating point result is different than the preferred quantum; and providing, in response to the determining that the quantum of the decimal floating point result is different than the preferred quantum, an output indicating a quantum exception, the quantum exception occurring only in response to the quantum of the decimal floating point result being different than the preferred quantum.

16. The computer program product of claim 15, the providing an output comprising setting, in response to determining that the quantum of the decimal floating point result is different than the preferred quantum, a quantum exception flag.

17. The computer program product of claim 15, the method further comprising:

maintaining a quantum exception flag in one of a set state and a not set state;

maintaining a quantum exception mask in one of a set state and a not set state;

executing a sequence of program instructions, the sequence of program instructions comprising the machine instruction;

storing the decimal floating point result into a destination storage location;

continuing, in response to the quantum exception mask being in the not set state and determining that the quantum of the decimal floating point result is different than the preferred quantum, execution of the sequence of instructions; and trapping, in response to the quantum exception mask being in the set state and determining that the quantum of the decimal floating point result is different than the preferred quantum, execution of the sequence of program instructions, the trapping comprising executing a program interrupt handler, and the providing the output comprising setting the quantum exception flag into the set state.

18. The computer program product of claim 17, the method further comprising:

determining, subsequent to the executing the sequence of program instructions, that the quantum exception flag is in the set state; and altering program execution, in response to determining that the quantum exception flag is in the set state and subsequent to the executing the sequence of program instructions, to address the occurrence of the quantum exception.

19. The computer program product of claim 17, further comprising:

reading a quantum exception mask value encoded into a machine language instruction corresponding to the instruction for the decimal floating point operation, the maintaining the quantum exception mask comprising using, for a duration of execution of the instruction for the decimal floating point operation, the quantum exception mask value.

20. A data processing system comprising:

a memory;

a processor communicatively coupled to the memory, wherein the processor comprises:

a quantum exception detector for determining, in response to performing a decimal floating point operation, that a quantum of a decimal floating point result of the decimal floating point operation is different than a preferred quantum, the preferred quantum being based upon at least one decimal floating point operand of the decimal floating point operation and indicating a defined value represented by a least significant digit of a significand of the decimal floating point result; and a quantum exception response unit for providing, in response to the quantum exception detector determining that the quantum of the decimal floating point result is different than the preferred quantum, an output indicating a quantum exception, the quantum exception occurring only in response to the quantum of the decimal floating point result being different than the preferred quantum.

21. The system of claim 20, the quantum exception response unit provides an output comprising triggering a software execution trap.

22. The system of claim 20, further comprising:
a quantum exception flag that is changeably assigned a set state and a not set state; and
a quantum exception mask that is changeably assigned a set state and a not set state,
the quantum exception detector further assigns the quantum exception flag the set state in response to determining that the quantum of the decimal floating point result is different than the preferred quantum, and
the quantum exception response unit:
causes program execution to trap, by causing execution of a program interrupt handler, in response to the quantum exception mask being assigned the set state and the quantum exception detector determining that the quantum of the decimal floating point result is different than the preferred quantum; and
causes program execution to continue in response to the quantum exception mask being assigned the not set state and the quantum exception detector determining that the quantum of the decimal floating point result is different than the preferred quantum.

23. The system of claim 22, further comprising an instruction processor configured to:
execute a sequence of executes a sequence of program instructions comprising the machine instruction;
determine, subsequent to the executing the sequence of program instructions, that the quantum exception flag is assigned the set state; and
alter program execution, in response to determining that the quantum exception flag is assigned the set state and subsequent to the executing the sequence of program instructions, to address the occurrence of the quantum exception.

* * * * *